(12) United States Patent
Marshall

(10) Patent No.: US 8,113,662 B2
(45) Date of Patent: Feb. 14, 2012

(54) SYSTEM AND METHOD FOR REDUCING THE EFFECT OF AN IMAGE ARTIFACT

(75) Inventor: Stephen W. Marshall, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 465 days.

(21) Appl. No.: 12/358,014

(22) Filed: Jan. 22, 2009

(65) Prior Publication Data

US 2010/0182574 A1    Jul. 22, 2010

(51) Int. Cl.
*G03B 21/14*      (2006.01)
(52) U.S. Cl. .................................. 353/38; 353/121
(58) Field of Classification Search ............ 353/38, 353/20, 121; 349/112; 348/744
See application file for complete search history.

(56) References Cited

U.S. PATENT DOCUMENTS

| | | | |
|---|---|---|---|
| 3,733,122 A * | 5/1973 | Szymber | 353/103 |
| 6,791,739 B2 | 9/2004 | Ramanujan et al. | |
| 2003/0039036 A1* | 2/2003 | Kruschwitz et al. | 359/707 |
| 2006/0007521 A1* | 1/2006 | Akiyama | 359/290 |
| 2006/0028961 A1 | 2/2006 | Kim et al. | |
| 2006/0092515 A1 | 5/2006 | Kim et al. | |
| 2006/0126184 A1 | 6/2006 | Kim et al. | |
| 2007/0035826 A1 | 2/2007 | Yokoyama et al. | |
| 2007/0171521 A1* | 7/2007 | Sugawara et al. | 359/443 |

* cited by examiner

*Primary Examiner* — Francis M Legasse, Jr.
(74) *Attorney, Agent, or Firm* — Warren L. Franz; Wade J. Brady, III; Frederick J. Telecky, Jr.

(57) ABSTRACT

In accordance with the teachings of the present disclosure, a system and method for displaying an image are provided. In one embodiment, the method includes receiving a laser through a rotary diffuser. The rotational speed of the rotary diffuser may be continuously varied to reduce the effect of an image artifact in a light pattern. The image artifact may be caused by an imperfection in the rotary diffuser. The light pattern is projected on a display device.

15 Claims, 1 Drawing Sheet

SYSTEM AND METHOD FOR REDUCING THE EFFECT OF AN IMAGE ARTIFACT

TECHNICAL FIELD

The present invention relates generally to systems and methods for displaying an image, and more particularly to systems and methods for reducing the effect of an artifact in a displayed image.

BACKGROUND

Spatial light modulators are devices that may be used in a variety of optical communication and/or video display systems. In some applications, spatial light modulators may generate an image by controlling a plurality of individual elements that control light to form the various pixels of the image. One example of a spatial light modulator is a digital micro-mirror device ("DMD"), sometimes known as a deformable micro-mirror device.

Intensity spots that degrade the quality of a displayed image may be referred to as the speckle effect. To reduce the speckle effect that may occur when an image is generated from a laser light source, one or more diffusers may be positioned along the optical path of the laser. An imperfection in a diffuser may create an undesirable light pattern that is visible on a display screen.

SUMMARY OF THE INVENTION

In accordance with the teachings of the present disclosure, a system and method for displaying an image are provided. In one embodiment, the method includes receiving a laser through a rotary diffuser. The rotational speed of the rotary diffuser may be continuously varied to reduce the effect of an image artifact in a light pattern. The image artifact may be caused by an imperfection in the rotary diffuser. The light pattern is projected on a display device.

Technical advantages of some embodiments of the present disclosure may include reducing the visibility of undesirable image artifacts that would otherwise be perceived by a viewer. By continuously varying the rotational speed of a rotary diffuser, the position of a brightness level variation may not be in the same position long enough for a human eye to perceive it.

Further technical advantages may include the ability to place a rotary diffuser in various locations within the optical path and still produce a quality image.

Other technical advantages of the present disclosure may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF THE INVENTION

Figure 1:
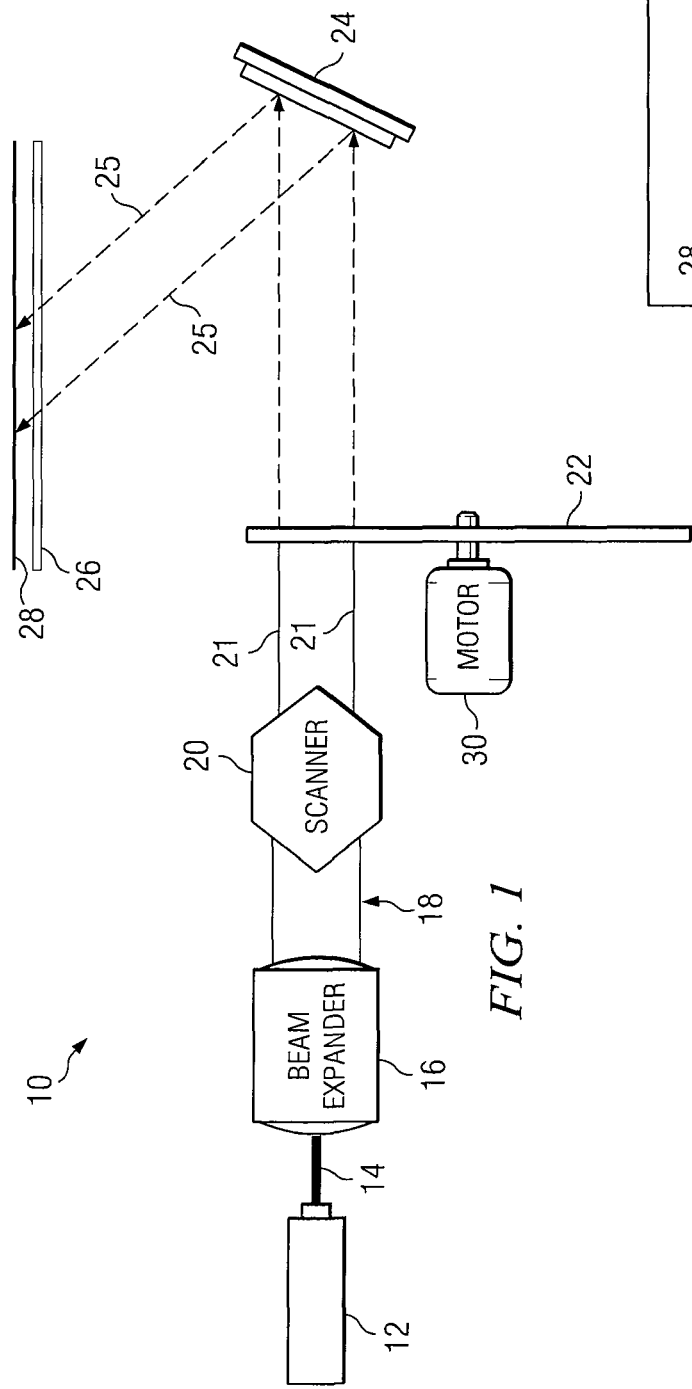
FIG. 1 is a block diagram of an imaging system, in accordance with particular embodiments of the present disclosure.

FIG. 1 is a block diagram of one embodiment of imaging system 10. Imaging system 10 may be used to selectively direct a light source to display on a screen. Imaging system 10 may include light source 12. Light source 12 may comprise any of a variety of different types of light sources, such as, for example, a metal halide lamp, a xenon arc lamp, an LED, a laser, etc. Light source 12 may be capable of generating one or more beams 14 of light. Each beam 14 may be of a different color (e.g., red, green, blue, yellow, cyan, magenta, white, etc.) or one or more colors may be repeated (e.g., there may be two red beams, one blue beam and one green beam). For example, in FIG. 1, light source 12 may include a red laser, a green laser, and a blue laser. Other embodiments may include additional light sources and/or additional colors. The additional colors may, for example, be used to create certain effects or to manipulate the color space. At any time, one, more than one, or all of the beams of light source 12 may be emitted.

Beam 14 may be concentrated and may be received by beam expander 16. Beam expander 16 may also be referred to as a line generator. Beam expander 16 may include a lens and/or any other suitable device, component, material or technique for bending, reflecting, refracting, focusing or otherwise manipulating beam 14 to expand or spread it into a line that may be received by scanner 20.

Scanner 20 may comprise a lens and/or any other suitable device, component, material or technique for bending, reflecting, refracting, focusing or otherwise manipulating expanded beam 18 to produce scanning beams 21. Focusing expanded beam 18 into scanning beams 21 may allow scanning beams 21 to be spread across the full width of an active area of modulator 24. An active area of modulator 24 may be a portion that maps to the visible area of display screen 28 (e.g., light incident on the active area may be directed along projection light path 25 towards display screen 28).

Different color scanning beams 21 may simultaneously illuminate portions of the active area of modulator 24. Scanner 20 also may scroll scanning beams 21 so that they scan down the height of modulator 24.

It may be appreciated that imaging system 10 may also include additional optical components (not explicitly shown), such as, for example, lenses, mirrors and/or prisms operable to perform various functions, such as, for example, filtering, directing, and focusing light beams.

Modulator 24 may comprise any device capable of selectively communicating, for example by selective redirection, at least some of the light from scanning beams 21 along projection light path 25 and/or along an off-state light path. In various embodiments, modulator 24 may comprise a spatial light modulator, such as, for example, a liquid crystal display (LCD) modulator, a reflective liquid crystal on silicon ("LCOS") modulator, interferometric modulator, or a light emitting diode modulator. In particular embodiments, modulator 24 may comprise a digital micro-mirror device (DMD).

The DMD may be a micro electro-mechanical device comprising an array of tilting micro-minors (the number of micromirrors may be based on the number of pixels to be displayed). From a flat state, the micro-mirrors may be tilted, for example, to a positive or negative angle to alternate the micro-minors between an "on" state and an "off" state. In particular embodiments, the micro-minors may tilt from +10 degrees to −10 degrees. In other embodiments, the micro-mirrors may tilt from +12 degrees to −12 degrees. To permit the micro-mirrors to tilt, each micro-mirror may be attached to one or more hinges mounted on support posts and spaced by means of an air gap over underlying control circuitry. The control circuitry provides electrostatic forces based, at least in part, on image data received from an image source (e.g., a Blu-ray Disc™ player or cable box).

The electrostatic forces cause each micro-mirror to selectively tilt. Incident light illuminating the micro-mirror array may be reflected by the "on" micro-mirrors along projection light path 25 for receipt by display screen 28 or it may be reflected by the "off" micro-mirrors along off-state light path (not shown) for receipt by a light dump (not shown). The pattern of "on" versus "off" mirrors (e.g., light and dark mirrors) forms an image that is projected onto a display screen 28.

Display screen 28 may be any type of screen able to display a projected image. For example, in some embodiments display screen 28 may be part of a rear projection TV. In particular embodiments, display screen 28 may be a screen used with a projector, or even simply a wall (e.g., a wall painted with an appropriate color or type of paint).

In certain embodiments, imaging system 10 may process laser light to create an image on display screen 28. One disadvantage of the use of lasers in projection display systems, such as imaging system 10, is the speckle effect. Speckle arises due to the high degree of coherence (both spatial and temporal) inherent in most laser sources. Speckle may manifest itself as a noise component in the image. Speckle may occur due to interference of the laser beams reflected at the one or more image receiving components of imaging system 10. The speckle noise may cause a glittering of the image or bright and dark portions of the image.

Speckle may result in part because the surface of display screen 28 may not be completely flat, but may have irregularities. As a result of these irregularities, when phases of respective light beams match at a point reflected off display screen 28, the light beams may interfere with each other, and the light intensities may be increased. Speckle may result in intensity spots in the displayed image, which may result in glittering or bright and dark spots to human eyes. As a result, the quality of a projected image may be degraded. This may make the viewer uncomfortable or tired.

Diffusers in the optical path of imaging system 10 may be used to reduce the speckle effect experienced by the viewer. In certain embodiments, a screen diffuser 26 may be positioned such that light reflecting from modulator 24 passes through screen diffuser 26 before reaching display screen 28. Screen diffuser 26 may be approximately the size of display screen 28. Screen diffuser 26 may rotate such that each point of screen diffuser 26 rotates with respect to display screen 28.

In addition to screen diffuser 26, rotary diffuser 22 may also be included in imaging system 10 to help reduce the speckle effect. Rotary diffuser 22 may rotate in the optical path of imaging system 10. Rotary diffuser 22 may be driven by motor 30 and may be positioned between scanner 20 and modulator 24 within the optical path. Rotary diffuser 22 may be located either ahead or behind scanner 20 in the optical path of imaging system 10. In certain embodiments, rotary diffuser 22 may be positioned ahead of scanner 20 in the optical path, as shown in FIG. 1.

The combination of rotary diffuser 22 and screen diffuser 26 may help reduce speckle that may be observed by a viewer by phase modulating laser light emitted from light source 12. This may cause the speckle pattern to move around in the image. A moving speckle pattern in an image may be less visible than a fixed pattern. The viewer's eye may integrate the peaks and valleys of the moving speckle effect and the overall result may be less visible speckle.

Figure 3:
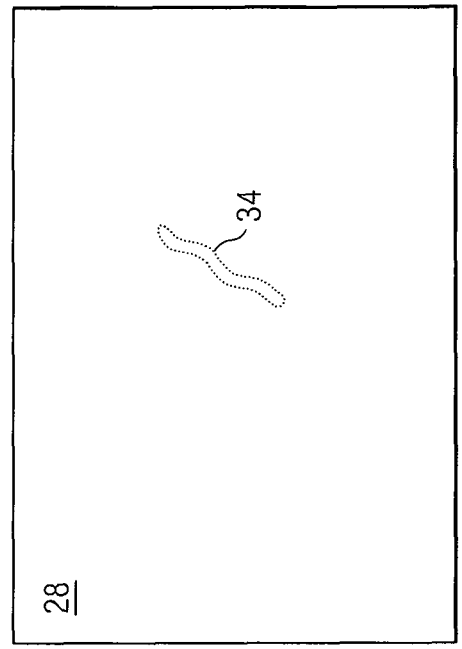
FIG. 3 illustrates a front view of a display screen showing an image artifact, in accordance with particular embodiments of the present disclosure.
Figure 2:
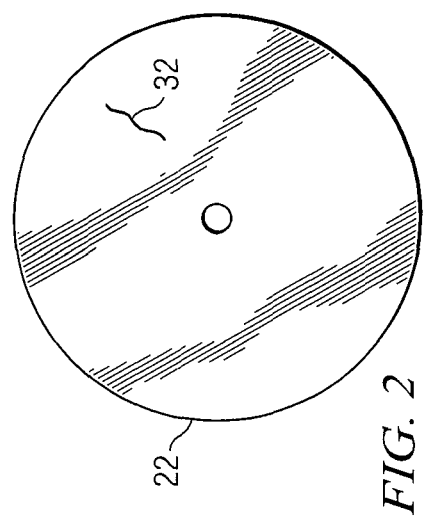
FIG. 2 illustrates a front view of a rotary diffuser, in accordance with particular embodiments of the present disclosure.

FIG. 2 illustrates a front view of rotary diffuser 22. Rotary diffuser 22 may contain an imperfection 32. Because rotary diffuser 22 is in the optical path of imaging system 10, imperfection 32 may be visible on display screen 28 as shown in FIG. 3. FIG. 3 illustrates a front view of display screen 28 which may be viewed by a viewer. Display screen 28 may include pattern 34 visible by a viewer. Pattern 34 may be created by light being projected through rotary diffuser 22 which includes imperfection 32. Imperfection 32 may be a radial scratch in rotary diffuser 22. Pattern 34 may be a brightness variation in the form of a fixed pattern on display screen 28 or may be in the form of a slowly moving pattern. In certain embodiments, the rotational speed of rotary diffuser 22 may be varied, as opposed to a constant rotational velocity. According to the teachings of the disclosure, the rotational speed of rotary diffuser 22 may be varied, in some embodiments constantly, by continuous rotational acceleration and deceleration, in some embodiments. By varying the rotational speed of rotary diffuser 22, the brightness variation of pattern 34 may be smoothed out. This may result from pattern 34 continuously changing its location on display screen 28. The result of this changing location, may be a series of images of patterns 34 that are superimposed over each other in different locations on display screen 28. A viewer's eye may integrate these multiple images and minimize their visibility. Thus, the viewer may not see a fixed or slowly moving pattern, but rather pattern 34 may be integrated by the viewer's eye and may be perceived to the viewer as not being there at all.

A human eye may be capable of perceiving a brightness variation or other undesirable artifact on display screen 28 if it is moving up to 10 or 12 Hz. If the display of the artifact is faster than that, the human eye may integrate the image, and it will be perceived as not being there. The imperfection 32 in rotary diffuser 22 may not be perceived by a viewer because the image created by imperfection 32 may have a varying position. As a result, it may not be in the same position long enough for a human eye to perceive it. That is, it may be moving faster than the human eye can see.

In one embodiment, rotary diffuser may be accelerated until it reaches a maximum rotational velocity and then essentially immediately decelerated to a minimum rotational velocity resulting in a continuously varying rotational velocity for rotary diffuser 22. The acceleration and deceleration may be over a linear acceleration ramp. The maximum rotational velocity may be between 135 Hz to 150 Hz. The minimum rotational velocity may be between 60 Hz to 100 Hz. The rotary diffuser may also have a rotational velocity of zero when it is accelerated from rest. The cycle time for the rotational velocity to ramp up from the minimum rotational velocity to the maximum rotational velocity and decelerate back the minimum rotational velocity may be from 1.0 to 4.0 seconds. This range may take into account dynamic braking, which may allow a total cycle time of approximately one second. Any suitable maximum rotational velocity, minimum rotational velocity, and cycle time may be used in accordance with the teachings of embodiments of the present disclosure.

For example, in one embodiment motor 30 may rotate rotary diffuser 22 from 100 Hz to 140 Hz in approximately 1.6 seconds. Motor 30 may then decelerate the rotation of rotary diffuser 22. This deceleration may be from 140 Hz to 100 Hz in an additional 1.6 seconds. The acceleration and deceleration may result in a cycle time of approximately 3.2 seconds.

In another embodiment, motor 30 may rotate rotary diffuser 22 over a greater rotational frequency in less time. For example, motor 30 may rotate rotary diffuser 22 from 72 Hz to 144 Hz in approximately 0.6 seconds. After rotary diffuser 22 reaches the top of its acceleration, motor 30 may then decelerate the rotation of rotary diffuser 22. The deceleration may be from 144 Hz to 72 Hz in approximately 1.0 seconds. This combination of acceleration and deceleration may result in a total cycle time of 1.6 seconds.

In yet a further embodiment, the motor 30 may be made to accelerate to a maximum by applying the full torque of motor 30. Once rotary diffuser 22 reaches its maximum velocity, then it may be allowed to decelerate by coasting to a minimum velocity. In certain embodiments, this coasting deceleration may be aided by dynamic breaking. By using dynamic breaking, the total cycle time of acceleration to a maximum and deceleration using dynamic breaking may be reduced to about 1 second.

Although the present invention and its advantages have been described in detail, it should be understood that various changes, substitutions, and alterations can be made therein without departing from the spirit and scope of the invention as defined by the appended claims.

What is claimed is:

1. A method for displaying an image, comprising:
   receiving a laser through a rotary diffuser;
   varying continuously a rotational speed of the rotary diffuser to reduce the effect of an image artifact in a light pattern, the image artifact caused by a non-uniformity in the rotary diffuser; and
   projecting the light pattern on a display device.

2. A method for displaying an image, comprising:
   receiving a laser through a rotary diffuser;
   varying continuously a rotational speed of the rotary diffuser to reduce the effect of an image artifact in a light pattern, the image artifact caused by a non-uniformity in the rotary diffuser; wherein varying continuously the rotational speed includes:
      accelerating a rotation of the rotary diffuser from a minimum rotational speed to a maximum rotational speed; and
      decelerating the rotation of the rotary diffuser from the maximum rotational speed to the minimum rotational speed, the acceleration and the deceleration occurring over a cycle time; and
   projecting the light pattern on a display device.

3. The method of claim 2, wherein each of the acceleration and the deceleration is constant.

4. The method of claim 2, wherein each of the acceleration and deceleration occurs over a linear ramp.

5. The method of claim 2, wherein:
   the minimum rotational speed is greater than or equal to 60 Hertz and less than or equal to 100 Hertz;
   the maximum rotational speed is greater than or equal to 135 Hertz and less than or equal to 150 Hertz; and
   the cycle time is greater than or equal to 1 second and less than or equal to 4 seconds.

6. The method of claim 2, further comprising projecting the laser onto a spatial light modulator, the spatial light modulator creating the light pattern.

7. The method of claim 5, wherein:
   the minimum rotational speed is approximately 100 Hertz;
   the maximum rotational speed is approximately 140 Hertz; and
   the cycle time is approximately 3.2 seconds.

8. The method of claim 5, wherein:
   the minimum rotational speed is approximately 72 Hertz;
   the maximum rotational speed is approximately 144 Hertz; and
   the cycle time is approximately 1.6 seconds.

9. The method of claim 6, further comprising projecting the light pattern through a screen diffuser.

10. The method of claim 6, wherein the spatial light modulator comprises a digital micro-minor device.

11. A method for displaying an image, comprising:
    receiving a laser through a rotary diffuser;
    varying continuously a rotational speed of the rotary diffuser to reduce the effect of an image artifact in a light pattern, the image artifact caused by a non-uniformity in the rotary diffuser; wherein varying continuously the rotational speed further comprises:
       applying a maximum torque of a motor to the rotary diffuser, and
       allowing deceleration of the motor after reaching a maximum rotational speed; and
    projecting the light pattern on a display device.

12. The method of claim 11, further comprising applying dynamic braking to the motor after reaching the maximum rotational speed.

13. The method of claim 11, further comprising projecting the laser onto a spatial light modulator, the spatial light modulator creating the light pattern.

14. The method of claim 13, further comprising projecting the light pattern through a screen diffuser.

15. The method of claim 13, wherein the spatial light modulator comprises a digital micro-minor device.

* * * * *